William E. Kriedeman
INVENTOR.

Nov. 8, 1949 W. E. KRIEDEMAN 2,487,144
FRONT MOUNTED GRAIN SWATHER
Filed June 11, 1948 3 Sheets-Sheet 3
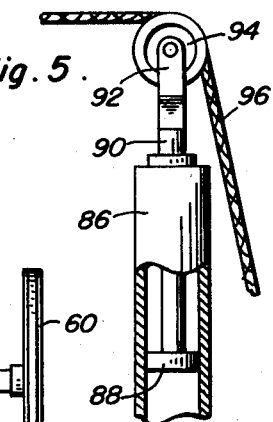
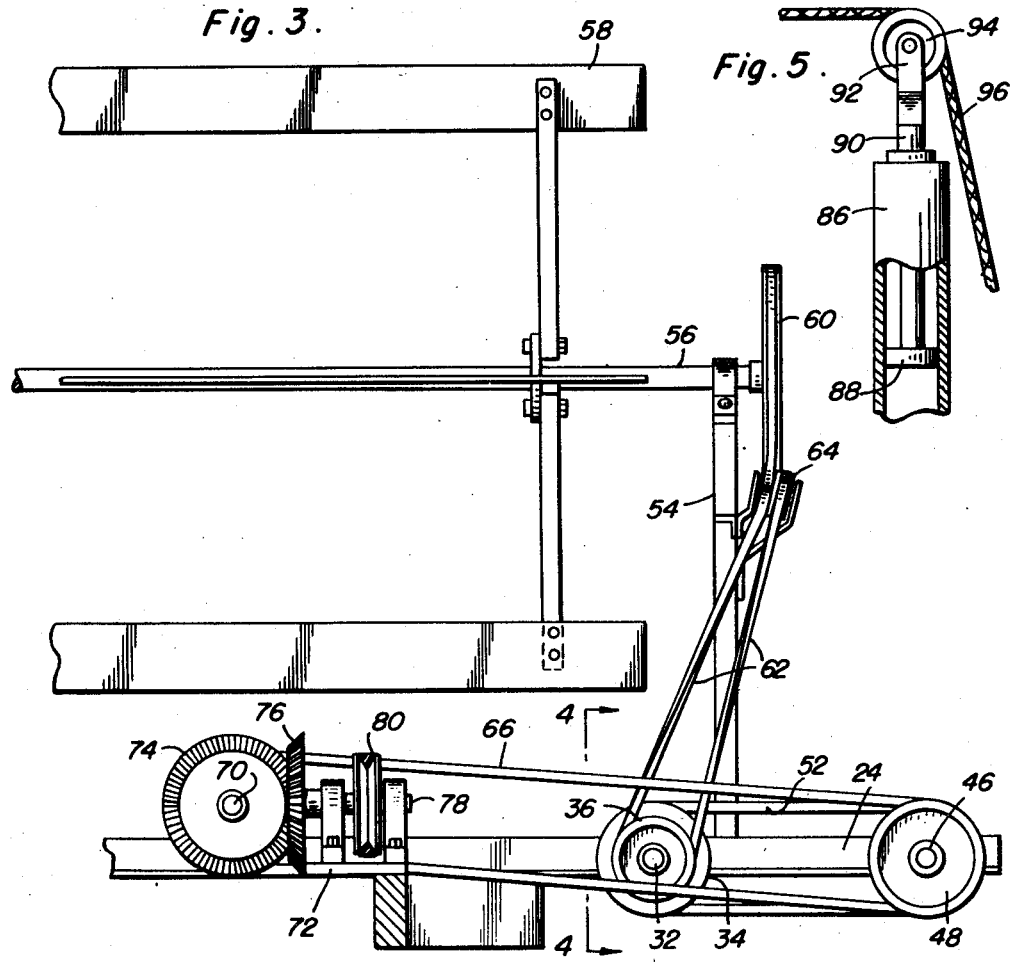
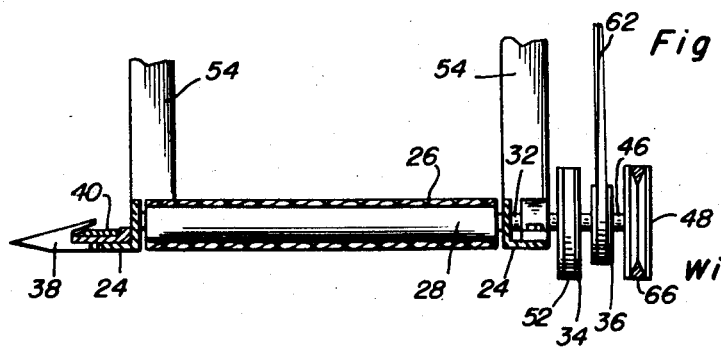
William E. Kriedeman
INVENTOR.

Patented Nov. 8, 1949

2,487,144

UNITED STATES PATENT OFFICE 2,487,144

FRONT MOUNTED GRAIN SWATHER

William E. Kriedeman, Balfour, N. Dak.

Application June 11, 1948, Serial No. 32,454

1 Claim. (Cl. 56—23)

This invention relates to new and useful improvements and structural refinements in agricultural implements, more specifically, grain swathers such as are commonly mounted on or drawn by tractors, and the principal object of the invention is to prevent the conventionally experienced damage or mutilation of the crop by the wheels of the tractor which preceded the swathing implement.

This object is achieved by mounting the swather forwardly of the tractor, so that the crop is cut and deposited in a swath without the wheels of the tractor coming in contact therewith.

An important feature of the invention resides in the provision of hydraulically actuated means for raising and lowering the swather with respect to the tractor by which it is carried, such raising and lowering means being disposed at both sides of the tractor and being provided with what may be referred to as equalizing means which assure that the carrier members attaching the swather to the tractor are raised and lowered simultaneously on both sides of the tractor, thereby maintaining the swather level at all times, even if the movement of the hydraulic means is not always synchronized.

Another very important feature of the invention resides in the provision of means for attaching the swather to the tractor, these means being extremely simple in construction whereby attachment and detachment of the swather may be effected with ease, convenience and expediency.

With the above more important objects and features in view and such other objects and features as may become apparent as this specification proceeds, the invention consists essentially of the construction and arrangement of parts as shown in the accompanying drawings in which:

Figure 3 is a cross sectional view, taken substantially in the plane of the line 3—3 in Figure 1;

Figure 4 is a cross sectional view, taken substantially in the plane of the line 4—4 in Figure 3; and Figure 5 is a fragmentary elevational view taken substantially in the plane of the line 5—5 in Figure 2 and illustrating the structure partially broken away.

Like characters of reference are employed to designate like parts in the specification and throughout the several views.

Figure 1:
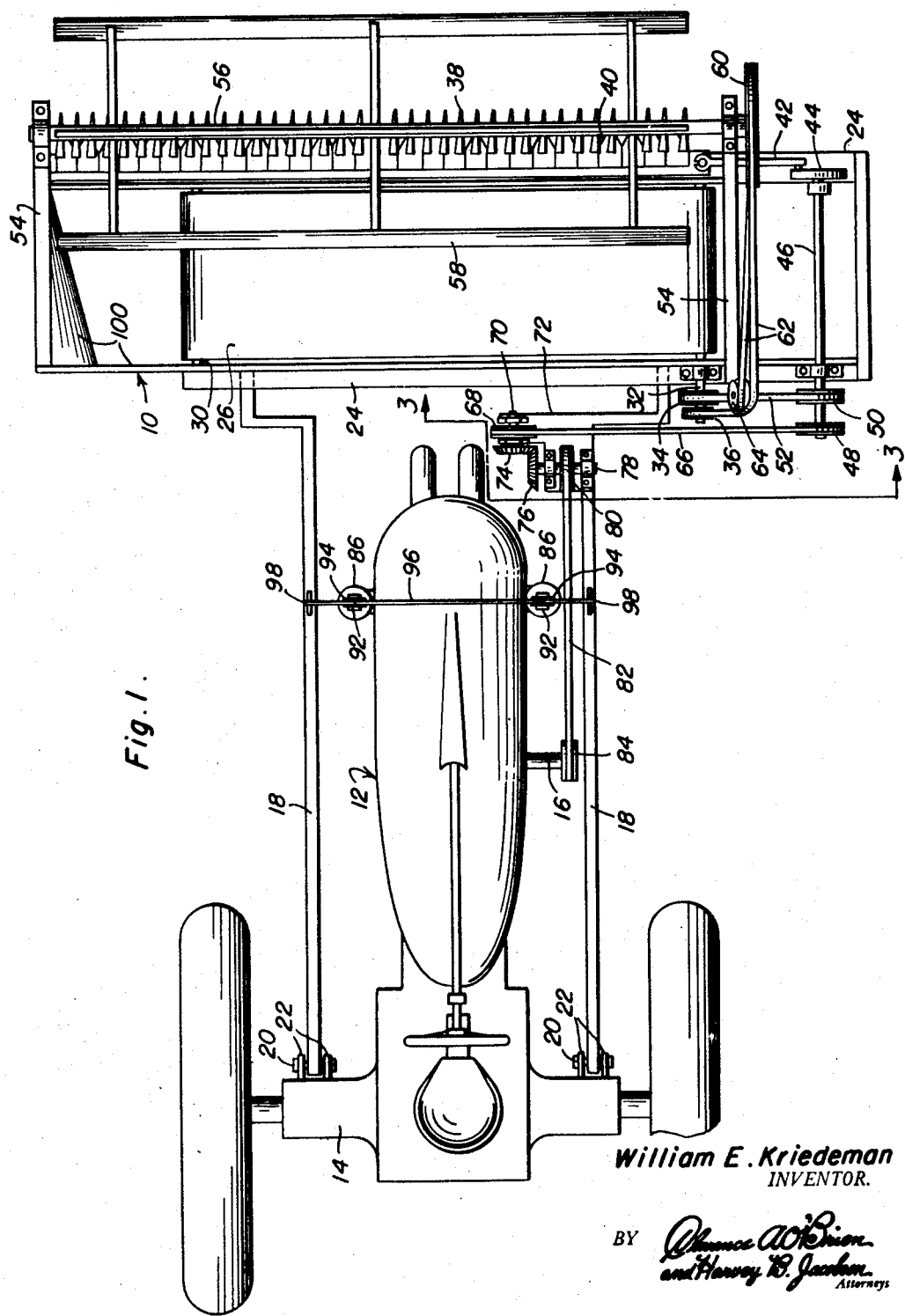
Figure 1 is a top plan view of the invention in situ on a tractor.
Figure 2:
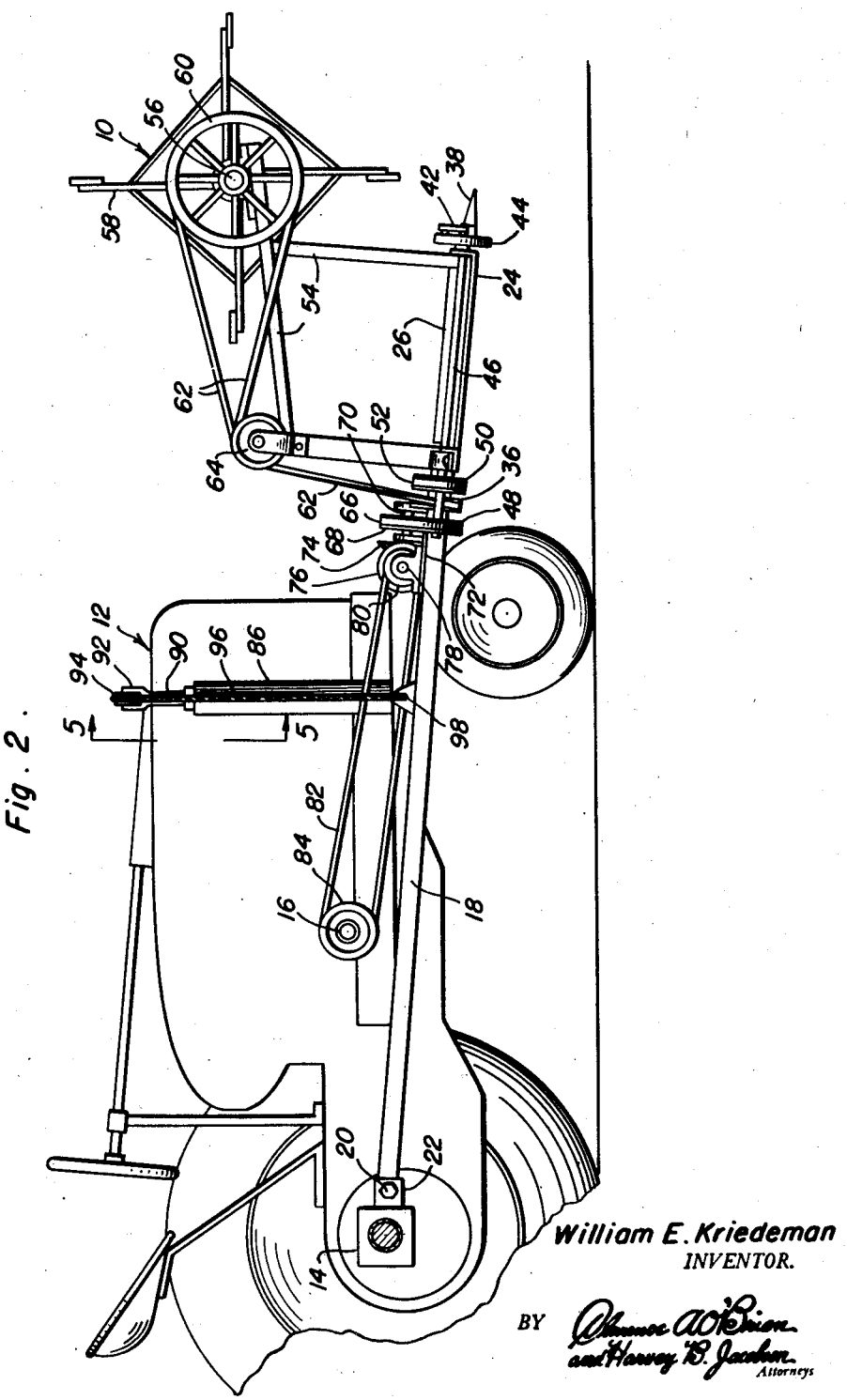
Figure 2 is a side elevational view thereof.

Referring now to the accompanying drawings in detail, the invention consists of a grain swather designated generally by the reference character 10, this being intended for use in the nature of an attachment for a conventional tractor 12.

The tractor 12 includes the usual rear axle housing 14 and is also provided with a laterally extending power take-off shaft 16.

The swather 10 embodies in its construction a pair of spaced frame members 18 which are disposed at the sides of the tractor 12 and have their rear end portions pivoted by means of suitable bolts 20 to pairs of brackets 22 secured to the axle housing 14, as will be clearly apparent.

It is to be noted that the carrier members 18 extend forwardly of the tractor 12 and carry an elongated frame 24 which extends transversely with respect to the tractor and projects laterally more toward one side than to the other, as shown in Figure 1.

An endless conveyor belt 26 passes around a pair of end rollers 28 carried by suitable shafts 30, 32 rotatably journaled in the frame 24, the shaft 32 carrying a pair of pulleys 34, 36.

A reciprocable sickle unit 38 of conventional type is mounted at the forward edge of the frame 24, the cutting blade 40 of the unit 38 being reciprocated by a pitman 42 which is operatively connected to a disc 44 mounted upon the shaft 46. The shaft 46 is rotatably journaled in the frame 24 and carries a pair of further pulleys 48, 50, the latter of which is operatively connected to the aforementioned pulley 34 by means of an endless belt 52.

A pair of spaced upright supports 54 are provided on the frame 24 and carry a transversely extending, rotatable shaft 56 on which is mounted the usual reel assembly 58. A pulley 60 is also secured to the shaft 56 and is connected by means of an endless belt 62 to the aforementioned pulley 36 on the shaft 32. The belt 62 is axially twisted, so to speak, and suitable guide pulleys 64 are provided on one of the supports 54 to assure proper alignment of the belt 62 with the pulleys 36 and 60, as will be readily apparent.

By virtue of the construction described, it is to be noted that rotation of the shaft 46 will simultaneously actuate the reel 58, the conveyor belt 26 and the sickle unit 38, the shaft 46 being rotated by means of an endless belt 66 which passes around the aforementioned pulley 48 and around a further pulley 68 which, in turn, is secured to a shaft 70 rotatably mounted upon a supporting plate or panel 72 carried by one of the aforementioned members 18.

The shaft 70 also carries a bevel gear 74 which meshes with a similar gear 76 secured to a shaft 78, the latter also being rotatably journaled on the plate 72 and carrying a pulley 80 operatively connected by an endless belt 82 to a further pulley 84 secured to the aforementioned power take-off shaft 16 of the tractor.

As stated in the opening paragraphs of this specification, one of the important features of the invention resides in the provision of hydraulically actuated means for raising and lowering the swather 10 with respect to the tractor 12, said means including a pair of hydraulic cylinders 86 disposed vertically at the sides of the tractor, these cylinders including pistons 88 secured to piston rods 90 which projects upwardly from the cylinders 86 and terminate in forked extremities 92. Suitable pulleys 94 are rotatably mounted in the forked extremities 92 of the piston rods, and a length of cable 96 passes over the pulleys 94 and has its ends secured to the carrier members 18 as at 98.

Accordingly, by simply actuating the cylinders 86, the piston rods 90 may be caused to slide upwardly or downwardly, thereby correspondingly raising or lowering the entire swather 10 about the pivots 20 on the tractor. This adjustment, of course, facilitates convenient raising and lowering of the sickle unit 38, so that the crop may be cut at an appropriate height from the ground.

Inasmuch as the two cylinders 90 and the pulleys 94 are provided at the opposite sides of the tractor, the two members 18 will be raised and lowered simultaneously, so as to maintain the swather level at all times. That is to say, if one of the cylinders 86 should move through a greater or a lesser distance than the second cylinder, the cable 96 passing over the rotatable pulleys 94 will automatically become adjusted in such manner that the members 18 will be raised or lowered through a like distance, maintaining the swather level.

Attention is also directed to the ease and convenience with which the swather may be attached to or detached from the tractor, the detaching operation, for example, being effected by simply removing the bolts 29 so as to disconnect the members 18 from the housing 14, disengaging the belt 82 from the pulley 84, and simply separating the swather from the tractor so as to disengage the cable 96 from the pulleys 94. Needless to say, the swather may be attached to the tractor by simply reversing the procedure of detaching, as above outlined.

It will be apparent from the foregoing paragraph that in addition to their primary "equalizing" utility, the pulleys 94 and the cable 96 readily assist in the attachment or detachment of the swather, the cable 96 being, of course, more easily disengageable from the pulleys 94 than it would be if it were connected directly to the piston rods 90.

It is to be noted that the side of the frame 24 (left side) which has the relatively greater amount of "overhang" with respect to the tractor 12, is formed with a delivery chute or opening 100, whereby the cut grain may be conveniently deposited in a swath upon the ground.

Accordingly, the crop will be cut and deposited on the ground at one side of the tractor, the forward mounting of the swather thus effectively preventing the tractor wheels from damaging or otherwise mutilating the crop, as usually occurs when conventional swathers are mounted at the rear end of the tractor or are drawn thereby.

Moreover, the front mounting of the swather will facilitate the use of a combine, if desired, simultaneously with the swather, the combine preferably being drawn by the same tractor which carries the swather, thus substantially minimizing the time and labor involved in the harvesting operation.

It may be added that another important advantage of the invention resulting from the front mounting of the swather on the tractor is that the operator of the tractor is enabled to visually supervise the operation of the swather without the necessity of turning his head to the rear, and is thus able to perform his work with greater efficiency, as will be clearly apparent.

It will be also observed that inasmuch as the pivots 20 of the frame members 18 are spaced rearwardly from the power take-off shaft 16, the belt 82 will be tightened when the attachment is lowered, and slackened when the attachment is raised, whereby the drive to the swathing mechanism will be automatically interrupted upon raising of the attachment when the device is to be transported from one site of operation to another.

It is believed that the advantages and use of the invention will be clearly understood from the foregoing disclosure, and accordingly, further description thereof at this point is deemed unnecessary.

Having described the invention, what is claimed as new is:

The combination of a tractor including a laterally projecting power take-off shaft, and a swather including an elongated frame pivotally attached to said tractor at a point spaced rearwardly from said power take-off shaft, said frame projecting forwardly from the tractor and having a swathing mechanism mounted on its front portion, means for raising and lowering said frame, a secondary shaft provided intermediate the ends of the frame and operatively connected to said mechanism, and a belt drive provided between said shafts, whereby said mechanism may be driven when said frame is lowered and whereby said drive may be automatically interrupted when the frame is raised.

WILLIAM E. KRIEDEMAN.

REFERENCES CITED

The following references are of record in the file of this patent:

UNITED STATES PATENTS

| Number | Name | Date |
|---|---|---|
| 2,318,409 | Millard et al. | May 4, 1943 |
| 2,348,634 | McEachern | May 9, 1944 |
| 2,387,070 | Hilblom | Oct. 16, 1945 |